United States Patent [19]
Yockers

[11] 3,763,397
[45] Oct. 2, 1973

[54] MONITORING AND SHUTDOWN APPARATUS

[75] Inventor: Lanny E. Yockers, Bartlesville, Okla.

[73] Assignee: Phillips Petroleum Company, Bartlesville, Okla.

[22] Filed: June 15, 1972

[21] Appl. No.: 263,222

[52] U.S. Cl............... 317/9 R, 123/198 D, 307/9, 307/218, 340/267 R
[51] Int. Cl. ............................................. H02h 3/00
[58] Field of Search.................. 307/218, 247, 291, 307/9; 123/198 D, 198 DA, 198 DB, 198 DC; 317/9 R, 9 B, 36 TD, 33 SC; 340/267 R

[56] References Cited
UNITED STATES PATENTS 3,601,103   8/1971   Swiden........................... 123/198 D
3,383,525   5/1968   Arksey........................... 307/218 X Primary Examiner—James D. Trammell
Attorney—Quigg & Oberlin

[57] ABSTRACT

A shutdown and/or alarm system is actuated by a monitor. The system includes an AND circuit and two multivibrators. The multivibrators have different reset times. A signal from the monitor triggers the first multivibrator, which triggers the second multivibrator when it resets. The AND circuit is actuated to energize a shutdown device and/or an alarm when both multivibrators are triggered.

5 Claims, 1 Drawing Figure

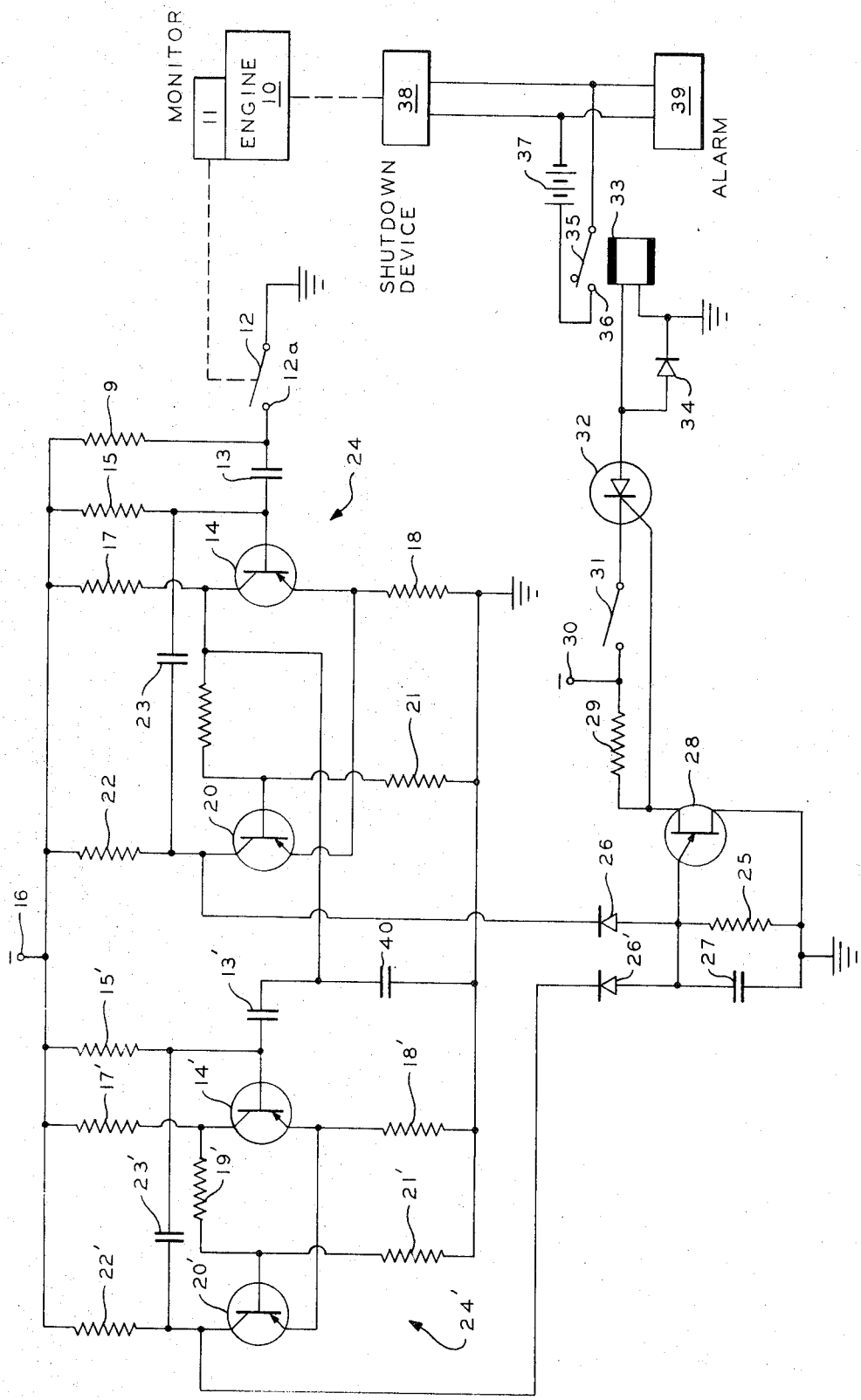

MONITORING AND SHUTDOWN APPARATUS

Safety devices of various types are frequently employed to monitor the operations of machines and processes. These safety devices measure an operating variable and provide an alarm or shutdown signal whenever the variable exceeds certain limits. For example, it is common practice to attach vibration sensing elements to machines to shut down the machines if excessive vibrations are detected. Flow monitors are used to detect the flow of lubricating oil to engines and compressors. Still another example of a safety device involves the use of temperature sensing elements to detect excessively high temperatures in various systems.

A problem is frequently encountered in the use of safety monitors if the monitor is constructed so that a single output signal above a threshold level results in automatically shutting down the apparatus being monitored. While this may be the ultimate purpose of the monitoring device, it is often not necessary to take such drastic action if the output signal exceeds the threshold level only momentarily. For example, the backfiring of an engine on startup may result in temporary excess vibration. However, this is not a permanent situation and does not require the engine to be shut down. In view of the fact that the shutting down of large compressors, pumps and engines can be an expensive operation and may cause serious operating problems in a plant, it is desirable to prevent the shutdown mechanism from being actuated each time a single "failure" signal is established.

A solution to this problem is provided in accordance with the present invention. The control apparatus attached to the monitor comprises an AND circuit which includes two diodes and an associated filter circuit. The diodes are controlled by respective multivibrator circuits which are actuated by signals from the monitor. The multivibrators have different reset times so that a second failure signal must be detected within a predetermined time interval after the first failure signal in order for both multivibrators to be in a state such that the AND circuit is triggered.

The FIGURE is a schematic circuit illustration of an embodiment of the apparatus of this invention.

Referring now to the drawing in detail, there is shown an engine 10 which is provided with a monitoring device 11. Engine 10 can represent a pump, compressor, or any other type of machine, the operation of which is to be controlled. Monitor 11 establishes an output signal when a measured variable exceeds predetermined limits. This monitor can be a vibration detector, a flow detector to measure the flow of lubricating oil in the engine, or a temperature sensing device, for example. The output signal from monitor 11 moves a switch 12 into engagement with a contact 12a whenever the detected variable exceeds a preset value.

Switch 12 is connected to ground. Terminal 12a is connected by a capacitor 13 to the base of a transistor 14 and by a resistor 9 to a terminal 16 which is maintained at a negative potential. The base of transistor 14 is connected by a resistor 15 to terminal 16. The collector of transistor 14 is connected to terminal 16 by a resistor 17, and the emitter of transistor 14 is connected to ground by a resistor 18. The collector of transistor 14 is connected by a resistor 19 to the base of a transistor 20. A resistor 21 is connected between the base of transistor 20 and ground. The collector of transistor 20 is connected by a resistor 22 to terminal 16. A capacitor 23 is connected between the base of transistor 14 and the collector of transistor 20. The circuit thus far described constitutes a first multivibrator 24.

A second multivibrator 24' is provided which corresponds to multivibrator 24 and wherein corresponding elements are designated by like primed reference numerals. In one specific embodiment of this invention, the two multivibrators are identical except with respect to the size of capacitors 23 and 23'. Capacitor 23' has a larger capacitance than does capacitor 23. The collector of transistor 14 is connected by a capacitor 13' to the base of transistor 14'. A capacitor 40 is connected between the collector of transistor 14 and ground.

A resistor 25 and a first diode 26 are connected in series relationship between ground and the collector of transistor 20. A capacitor 27 is connected in parallel with resistor 25. A diode 26' is connected between capacitor 27 and the collector of transistor 20'. The junction between resistor 25 and diodes 26 and 26' is connected to the emitter of a unijunction transistor 28. The first base of this transistor is connected to ground, and the second base is connected by a resistor 29 to a terminal 30 which is maintained at a negative potential. A switch 31 is connected between terminal 30 and the cathode of a silicon controlled rectifier 32. The control electrode of rectifier 32 is connected to the second base of transistor 28. A relay coil 33 is connected between the anode of rectifier 32 and ground. A rectifier 34 is connected in parallel with relay coil 33.

When relay coil 33 is energized, a switch 35 is moved into engagement with a terminal 36. This connects a current source 37 in circuit with a shutdown device 38 and an alarm 39. Shutdown device 38 operates to shut down engine 10.

In the absence of an output signal from monitor 11, switch 12 remains open. At this time transistors 14 and 14' are in a conducting state and transistors 20 and 20' are non-conducting. An output pulse from monitor 11 serves to close switch 12 during the time that such pulse exists. Such a closure of switch 12 results in a positive pulse being applied to the base of transistor 14. This causes transistor 14 to beocme non-conducting, which in turn results in transistor 20 conducting. The time that transistor 20 remains conducting is determined by the value of capacitor 23. At the end of this time interval, which can be of the order of two seconds in the specific example described hereinafter, transistor 14 again conducts and transistor 20 becomes non-conducting. This transistion back to the initial state results in a positive pulse being transmitted from the collector of transistor 14 to the base of transistor 14'. This causes multivibrator 24' to shift states in the same manner as herein described with respect to multivibrator 24. The time for the subsequent reversal to take place is determined by the value of capacitor 23', which is selected in the specific example to be of the order of 4 seconds.

If monitor 11 closes switch 12 again after multivibrator 24 has shifted back to its initial state, the multivibrator is again shifted in the manner described above. When transistors 20 and 20' are both in a conducting state, the negative potential is removed from capacitor 27 so that this capacitor discharges through resistor 25. This causes transistor 28 to conduct to fire rectifier 32. The firing of rectifier 32 results in relay coil 33 being energized to move switch 35 into engagement with terminal 36. This actuates shutdown device 38 to shut down engine 10 and to actuate alarm 39. The apparatus can be reset by manually opening switch 31.

In one specific embodiment of this invention, resistor 9 was 82,000 ohms. Resistors 15 and 15' were 27,000 ohms each. Resistors 17, 22, 17' and 22' were 1,000 ohms each. Resistors 19 and 19' were 6,800 ohms each. Resistors 21 and 21' were 2,200 ohms each. Resistors 18 and 18' were 200 ohms each. Resistor 25 was 22,000 ohms, and resistor 29 was 100 ohms. Capacitors 13 and 13' were 0.005 microfarad each. Capacitor 23 was 100 microfarads and capacitor 23' was 250 microfarads. Capacitor 40 was 0.05 microfarad. Capacitor 27 was 20 microfarads. Transistors 14, 20, 14' and 20' were each Type 2N 404A. Transistor 28 was Type 2N 4891. Rectifier 32 was Type 2N 1595. Diodes 26, 26' and 36 were Type 1N 4009. Terminals 16 and 30 were maintained at a potential of −12 volts.

While this invention has been described with a presently preferred embodiment, it should be apparent that it is not limited thereto.

What is claimed is:

1. Control apparatus adapted to be used in monitoring systems in which a monitor establishes a first signal whenever a measured variable exceeds a preselected limit, said apparatus comprising:

a first one-shot multivibrator adapted to change from a first state to a second state when an input signal is applied thereto and to change back to the second state at the end of a first predetermined time interval after the input signal is received, the input of said first multivibrator being adapted to receive said first signal;

a second one-shot multivibrator adapted to change from a first state to a second state when an input signal is applied thereto and to change back to the first state at the end of a second predetermined time interval after the input signal is received, said second predetermined time interval being longer than said first predetermined time interval;

means to connect said first multivibrator to said second multivibrator so that an input signal is applied to said second multivibrator from said first multivibrator when said first multivibrator changes from the second state to the first state;

an AND circuit adapted to provide an output signal when actuated by two input signals;

means connecting said AND circuit to said first and second multivibrators so that first and second input signals are applied to said AND circuit from said first and second multivibrators, respectively, when said first and second multivibrators are in their respective second states, thereby actuating said AND circuit; and a shutdown device connected to said AND circuit to be actuated by said output signal.

2. Control apparatus adapted to be used in monitoring sytems in which a monitor establishes a first signal whenever a measured variable exceeds a preselected limit, said apparatus comprising:

a first one-shot multivibrator adapted to change from a first state to a second state when an input signal is applied thereto and to change back to the second state at the end of a first predetermined time interval after the input signal is received, the input of said first multivibrator being adapted to receive said first signal;

a second one-shot multivibrator adapted to change from a first state to a second state when an input signal is applied thereto and to change back to the first state at the end of a second predetermined time interval after the input signal is received, said second predetermined time interval being longer than said first predetermined time interval;

means to connect said first multivibrator to said second multivibrator so that an input signal is applied to said second multivibrator from said first multivibrator when said first multivibrator changes from the second state to the first state; and an AND circuit adapted to provide an output signal when actuated by two input signals, said AND circuit comprises a capacitor having one terminal connected to a point of reference potential, a resistor connected in parallel with said capacitor, a first diode connected between the second terminal of said capacitor and said first multivibrator so that a first potential is applied to said first diode when said multivibrator is in said first state and a second potential is applied to said first diode when said first multivibrator is in said second state, and a second diode connected between the second terminal of said capacitor and said second multivibrator so that a first potential is applied to said second diode when said second multivibrator is in said first state and a second potential is applied to said second diode when said second multivibrator is in said second state, said capacitor discharging through said resistor when said first and second multivibrators are in respective second states, and further comprising a unijunction transistor having the emitter thereof connected to the second terminal of said capacitor, means applying a potential difference between the two bases of said unijunction transistor, and means connected to one of said bases to establish an output signal when said unijunction transistor is in a conductive state.

3. The apparatus of claim 2 wherein said means to establish an output signal comprises a silicon controlled rectifier, means to apply a potential across said rectifier, and means to connect said rectifier to said one base to trigger said rectifier in response to conduction by said transistor.

4. The apparatus of claim 2 wherein each of said multivibrators comprises first and second transistors each having an emitter, a collector and a base, the base of the first transistor being the input of the multivibrator and the collector of the second transistor being the output of the multivibrator, means connecting the emitter and the collector of each transistor in circuit with a source of potential, and a capacitor connected between the base of the first transistor and the collector of the second transistor, said means connecting said first multivibrator to said second multivibrator comprises means connecting the collector of the first transistor of the first multivibrator to the base of the first transistor of the second multivibrator, said first diode is connected to the collector of the second transistor of the first multivibrator, and said second diode is connected to the collector of the second transistor of the second multivibrator.

5. Control apparatus adapted to be used in monitoring systems in which a monitor establishes a first signal whenever a measured variable exceeds a preselected limit, said apparatus comprising:

a first one-shot multivibrator adapted to change from a first state to a second state when an input signal is applied thereto and to change back to the second state at the end of a first predetermined time interval after the input signal is received, the input of said first multivibrator being adapted to receive said first signal;

a second one-shot multivibrator adapted to change from a first state to a second state when an input signal is applied thereto and to change back to the first state at the end of a second predetermined time interval after the input signal is received, said second predetermined time interval being longer than said first predetermined time interval;

means to connect said first multivibrator to said second multivibrator so that an input signal is applied to said second multivibrator from said first multivibrator when said first multivibrator changes from the second state to the first state;

an AND circuit adapted to provide an output signal when actuated by two input signals; and an alarm connected to said AND circuit to be actuated by said output signal.

* * * * *